United States Patent
Balass

[11] Patent Number: 5,275,266
[45] Date of Patent: Jan. 4, 1994

[54] DOUBLE CLUTCH CHANGE-SPEED GEARBOX FOR MOTOR VEHICLES

[76] Inventor: Valentin Balass, Seestrasse 355, CH-8038 Zurich, Switzerland

[21] Appl. No.: 854,654
[22] PCT Filed: Aug. 29, 1991
[86] PCT No.: PCT/CH91/00185
§ 371 Date: Apr. 28, 1992
§ 102(e) Date: Apr. 28, 1992
[87] PCT Pub. No.: WO92/04558
PCT Pub. Date: Mar. 19, 1992

[30] Foreign Application Priority Data
Sep. 5, 1990 [CH] Switzerland .......... 2873/90

[51] Int. Cl.⁵ .......... B60K 41/22
[52] U.S. Cl. .......... 192/3.55; 192/3.62; 192/3.63; 192/83; 74/330
[58] Field of Search .......... 192/3.55, 3.62, 3.63, 192/83; 74/330, 335

[56] References Cited

U.S. PATENT DOCUMENTS

| 4,428,248 | 1/1984 | Beoucksou et al. | 192/3.55 X |
| 4,632,234 | 12/1986 | Bardoll et al. | 192/3.62 X |
| 4,727,472 | 2/1988 | Deutsch et al. | 364/183 |
| 4,860,607 | 8/1989 | Numazawa et al. | 74/330 |
| 5,038,901 | 8/1991 | Parsons et al. | 192/3.62 X |

FOREIGN PATENT DOCUMENTS

| 0088486 | 9/1983 | European Pat. Off. . |
| 0130130 | 1/1985 | European Pat. Off. . |
| 3536567 | 4/1986 | Fed. Rep. of Germany ..... 192/3.55 |
| 1562903 | 4/1969 | France . |
| 2180388 | 11/1973 | France . |
| 1411154 | 10/1975 | United Kingdom . |
| 2057607 | 4/1981 | United Kingdom . |

Primary Examiner—Rodney H. Bonck
Assistant Examiner—Andrea Pitts
Attorney, Agent, or Firm—Willian Brinks Hofer Gilson & Lione

[57] ABSTRACT

In a double clutch change-speed gearbox for motor vehicles with two simultaneously and oppositely controlled clutches (KA, KS), one of the higher gear stages is connected, as the selected gear, to one clutch (KS) and the other gear stages can be connected to the other clutch (KW). On engagement of the first-mentioned clutch (KS), which is controlled by means of its own switching element (SO), the other gear stage positions can be arbitrarily selected—also, in fact, by means of a conventional, manually actuated shift mechanism (SH, 17).

5 Claims, 2 Drawing Sheets

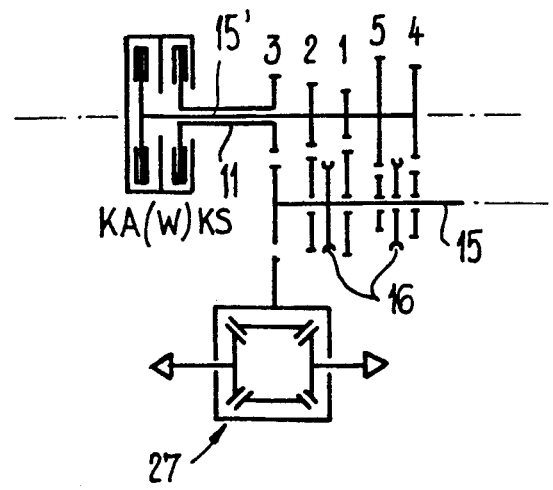
Fig.2
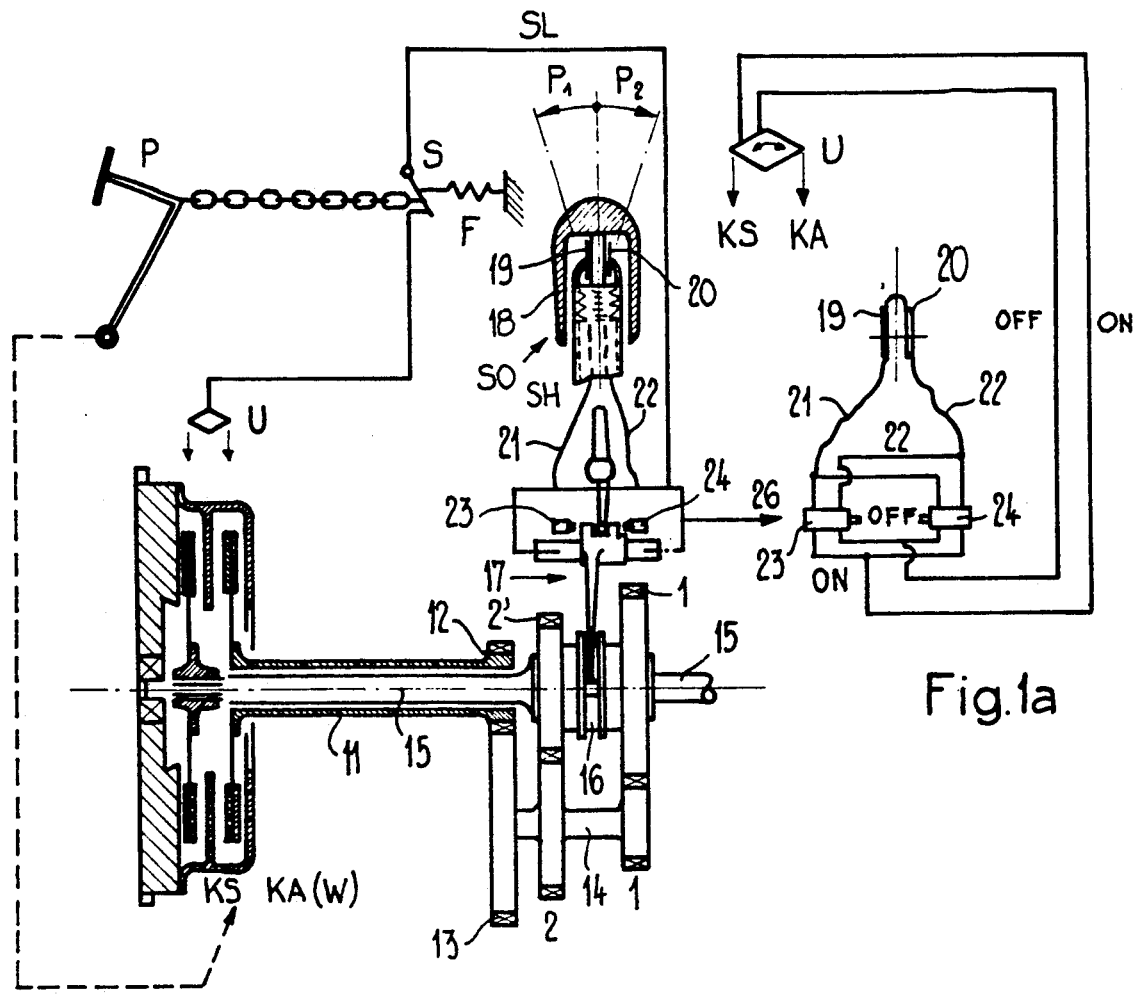
Fig.1a
Fig.1

DOUBLE CLUTCH CHANGE-SPEED GEARBOX FOR MOTOR VEHICLES

The invention concerns a double clutch change-speed gearbox for motor vehicles in accordance with the preamble to claim 1.

A motor vehicle gearbox of this type is described in EP-A2 0 144 737. The drive to the gearbox is divided into two coaxial shafts, each shaft being connected to a clutch. Gears 1, 3 and 5 are associated with one shaft and gears 2, 4 and reverse are associated with the other shaft or clutch. By actuating the corresponding clutch, it is possible in each case to change, without interrupting the tractive effort, from one gear of one shaft to one gear of the other shaft.

This gives rise, of course, to the limiting factor that the gears cannot be arbitrarily selected one after another. Thus, for example, it is possible to change down directly from fifth gear into fourth gear or second gear but not into third gear. This applies in an analogous manner to all the other gears and also, in fact, to changing up. The known gearbox also has a complicated electrohydraulic control system which is connected to a gear shift lever and which, in addition to the clutches, also controls the actuation of the gear shift in accordance with a specified program.

The invention is based on the object of increasing the freedom of choice in gear shifting in such a gearbox where the gear can be selected under load but, at the same time, of reducing and simplifying the complexity necessary for this purpose.

The object is achieved by means of the features of claim 1.

One simplification follows from the fact that the whole of the synchronizing and shift mechanism becomes unnecessary in the case of the selected gear associated with the selector clutch. In the case of a gearbox with direct through drive and operating with a countershaft, for example, the direct drive train can be connected to the selector clutch. In the case of a gearbox without direct through drive, only a simple gearwheel transmission is necessary for the selected gear, it being possible for the gearwheels to be permanently connected to the relevant shaft. In each case, the hollow shaft can be kept short because it is only necessary to accommodate one gearwheel on it.

If the selector clutch is in engagement, the vehicle operation takes place in the gear stage of the selected gear, and the shift gear positions can be arbitrarily selected. The shift gear stage whose position has in each case been selected becomes operationally effective by opposing actuation of the clutches by means of the switching element of the on/off control; it is therefore possible to change from the selected gear to any shift gear and back by, so to speak, pressing a button.

Because, due to the nature of such a gearbox, the clutches are actuated oppositely during each change, the selector clutch also comes into operation even when changing from one shift gear into another, although only for the duration of the gear-changing procedure; the duration of engagement of the selector clutch ends when the new gear position has been selected.

On the other hand, the selector clutch can be arbitrarily engaged and can remain so even if no other shift gear position is to be selected; the gear is then changed from the shift gear whose position has been selected to the selected gear without the necessity of actuating the gearbox itself.

If, for example, the third gear stage is connected as the selected gear to the selector clutch, the latter is engaged when changing the gearbox from first gear to second gear for the duration of the gear shift; in this case, the selector clutch develops, so to speak, a synchronizing function. If it is required to change from second gear to third gear, simply switching over from the gear shift clutch to the selector clutch is sufficient. Switching in the reverse direction restores second gear. It is therefore possible — in city traffic, for example—to alternate easily and rapidly between second and third gear, in particular without actuating the gearbox and without the conventional clutch operations.

The same applies analogously when, during the use of the selected gear, the fourth or fifth gear position is selected instead of the second; it is now possible to alternate between the third gear and the fourth or fifth gear by switching over the clutches. Expressing the matter otherwise, the third gear can also be used in each selected position of the gearbox by pressing a button.

Because the position of any of the associated shift gears can be selected in any given sequence during the period when the selector clutch is engaged, there is no necessity for gear preselection and it is possible to use a conventional mechanical shift linkage with several shift levels. The switching element for the clutches can then be accommodated on the shift lever or even be integrated into the shift lever. It is advantageous for this switching element to be actuated in the two selection directions of the shift lever but the effective connection of the switching element can be blocked, however, when the gear position has not been selected or the pull-away clutch is disengaged. An inverse connection is preferably associated with the switching element so that the switching direction of the switching element in opposite shift positions of the shift lever is in the opposite direction in each case. The possible shift/switching motions of the shift lever and the switching element are then in the same direction in each gear.

These and further details are explained below using illustrative examples of the invention shown in the drawing, in which FIG. 1 shows a diagram of a double clutch gearbox with through drive, only details of the clutch actuation and two shift gearwheel pairs, which can be selected by means of a mechanical shift linkage, being shown;

FIG. 1a shows a detail from FIG. 1 on a larger scale;

FIG. 2 shows a double clutch gearbox of a similar type with respect to the shift mechanism and clutch actuation but without through drive and having five gears and FIG. 3 shows an embodiment with a separate pull-away clutch.

Figure 3:
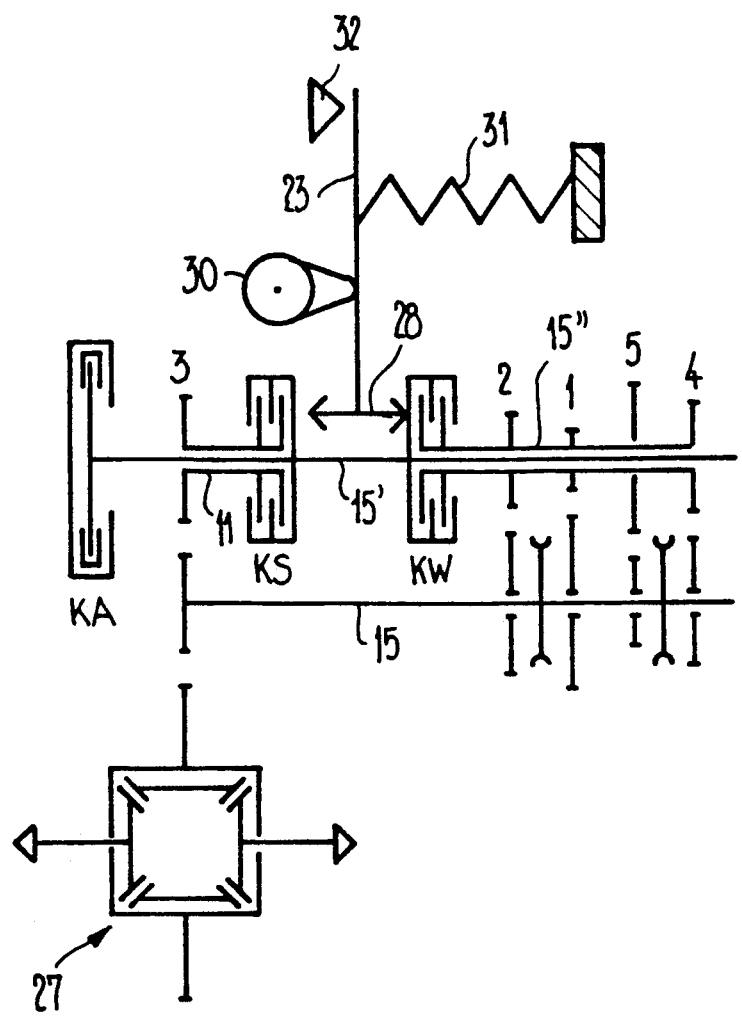

In FIG. 1, a gear shift clutch KA(W) designed as a pull-away clutch drives the countershaft 14 via a hollow shaft 11 and a gearwheel pair 12-13. The wheels 2, 1 permanently fixed to the countershaft 14 engage with shift gearwheels 2', 1', which are loosely seated so that they can rotate on a through shaft 15 connected to a selector clutch KS and extending through the hollow shaft 11. The selector sleeve 16 keyed to the through shaft 15 and located between the associated shift gearwheels 2', 1' can be actuated in the conventional manner by means of a conventional mechanical shift linkage 17 of well-known type, the selector sleeve 16 enclosing and carrying the conventional synchronizing rings and selector dogs. When it is displaced to one side or the other from the idling position shown, it connects one or other shift gearwheel 2', 1', to the through shaft 15, which is in turn connected to the differential gear (not shown).

The actuation and control of the clutches is indicated by electrical circuit symbols for the sole purpose of explaining the fundamental concept of this double clutch gearbox; the way in which the clutches, their actuation and control are designed in detail is of no significance whatsoever. As an example, the pull-away clutch KA can be a conventional spring-loaded dry clutch actuated by means of a foot pedal P. As is usual in such gearboxes, a changeover arrangement U, by means of which the clutches are simultaneously actuated in opposite directions, is of course provided. Upstream of the changeover arrangement, there is an interlock S which interrupts, by means of a tension spring F, the control conductor SL of the changeover arrangement U when the clutch pedal P is depressed. This represents a pull-away interlock for the normally open selector clutch. The latter is brought into engagement by a switch-on signal from a special on/off control, which is still to be explained in more detail. The changeover arrangement U ensures opposite actuation of the pull-away clutch.

As part of the on/off control mentioned, a switching element or switch SO is integrated in the handgrip 18 of the shift lever SH. The control conductor SL of the selector clutch KS and of the changeover arrangement can be activated by the switching element or switch SO when force is exerted on the handgrip in the direction of the arrows $P_1$ or $P_2$, i.e. in the direction of one or other shift motion of the shift lever. The contacts 19, 20 actuated by this and the connecting conductors 21, 22 of the switching element SO are, however, connected to the control conductor SL via an inverse connection designated overall by 26 and equipped with end switches 23, 24. The end switches 23 and 24 are displaced—as may be seen from FIG. 1—from their normal open condition into the closed condition by the shift linkage 17 when the second or first gear position is selected. There are further end switches which are actuated in a similar manner when the fourth and fifth gear positions are selected but these are not shown. If no gear position is selected, all the end switches are open and the contacts 19 and 20 of the switching element SO, which interact with the shift lever as the opposite contact, are electrically separated from the change-over arrangement U.

It may be seen from FIG. 1a that the end switches 23 and 24 each have two contact pairs of which one is connected to the "OFF" branch of the control conductor SL and the other is connected to its "ON" branch. FIG. 1a also shows that the contacts 19 and 20 are connected via their connecting conductors 21 and 22, respectively, simultaneously to the ON contact pair of one end switch and to the OFF contact pair of the other end switch; the same, of course, applies to the end switch pairs associated with the other gear stages. In consequence, the same contacts 19 and 20 produce inverse switching instructions depending on whether the shift lever SH is located in one or other of its mutually opposite shift positions, the arrangement being such that the contact 19 or 20 closed on the selection of a position for a shift gear is connected by the relevant end switch 23 or 24 to the OFF branch of the control conductor SL. By this means, the selector clutch KS comes out of engagement and the gear shift clutch KA(W) comes into engagement and the shift gear stage whose position has been selected becomes effective instead of the selected gear. Since, however, the other contact of the respective switch SO is simultaneously connected to the ON branch of the control conductor SL, it is possible to change over from the gear shift clutch to the selector clutch, i.e. back from the shift gear whose position has been selected to the selected gear (or vice versa), by tipping the handgrip 18 in the direction leading out of the selected position.

Assuming that no gear position has been selected, as shown in FIGS. 1, 1a, tipping the handgrip 18 of the shift lever SH in one or other shift direction $P_1$ or $P_2$ does not cause any closing of the selector clutch. If—with the clutch pedal depressed—the first gear position is selected for pull-away, the end switch 24 is, in fact, closed so that tipping the handgrip 18 in the direction $P_2$ activates the ON branch of the control conductor SL; the latter, however, is interrupted by the interlock S until the clutch pedal P is released; the vehicle is then, however, in motion in first gear. If the shift lever SH is now moved into the shift position for the second gear, the contact 20 is immediately closed and the selector clutch SK brought into engagement; as soon as the second gear position has been selected and the end switch 23 has closed, however, the switching instruction from the contact 20 passes via the end switch 23 to the OFF branch of the control conductor SL so that the selector clutch KS comes out of engagement and the gear shift clutch KA(W) comes into engagement. It is again possible, as in the first or any other shift gear, to alternate between the selected gear and the gear whose position has been selected by tipping the handgrip 18; movement of the shift lever is only necessary when a different shift gear position has to be selected. Because of this, the driving operation is decisively simplified because gear changing can, fundamentally, take place without clutch operation and under load and the clutch pedal has practically only to be actuated when pulling away or stopping. The pull-away/gear shift clutch can, of course, be designed and actuated in any desired manner.

In FIG. 2, the third gear stage is again connected to the selector clutch in a gearbox without direct through drive whereas the first and second gear stages can be connected to the drive shaft 15 of the gearbox by means of one selector sleeve 16 and the fourth and fifth gear stages can be connected to it by another selector sleeve 16. The drive gearwheel of the third gear stage is correspondingly seated on the hollow shaft 11 and the permanently connected wheels of the shift gears are permanently connected to the shaft 15' of the pull-away/gear shift clutch KA.

FIG. 3 shows an arrangement which basically corresponds to that of FIG. 2 but in which the gear shift clutch KW is not simultaneously designed as the pull-away clutch but is connected, at one end, to the shaft 15' of a separate clutch KA, used only for pull-away, and of course, at the other end, to the permanently connected wheels of the shift gears (via a hollow shaft 15"). The selector clutch KS is connected at one end to the shaft 15' of the pull-away clutch and, at the other end—via the hollow shaft 11—to the drive gearwheel of the third gear stage. (In both figures, the differential gear and the half shafts are indicated by 27.)

In FIG. 3, an actuation element 28 symbolically represented by a double arrow is located between the clutches KS and KW and this actuation element 28 can be set against one or other clutch in order to bring it into engagement. The actuation element 28 is located at the end of a pivoting lever 29 which has a pivot bearing 30 in the form of an eccentric; a spring 31 attempts to pivot the pivoting lever 29 about the pivot bearing 30 in the counterclockwise direction so that the actuating element holds the gear shift clutch KW in engagement while the selector clutch KS is disengaged. Opposite the free end of the pivoting lever 29, there is a stop 32 but the end of the pivoting lever 29 only comes into contact with the stop 32 when the eccentric 30 is rotated out of its effective position shown. The stop 31 now acts as the pivot bearing and the pivoting direction of the spring 31 is reversed; it presses the actuating element 28 against the selector clutch KS. The latter comes into engagement whereas the gear shift clutch KW is disengaged. The exaggerated intermediate spaces shown for ease of understanding in this actuation mechanism should not disguise the fact that the complete arrangement is practically without clearance and can be operated by means of two (e.g. hydraulic) stops (at 30 and 32) which have a mutually stiffening effect. It is also intended to illustrate that it is advantageous to ensure that the gear shift clutch is normally closed (so that, for example, the engine can be started by pushing).

The design shown in FIG. 3 may be seen to be particularly advantageous because the gearbox part including the shift gears, on the one hand, and the pull-away clutch, on the other, can be fundamentally the same as the designs conventional for decades. In particular, however, an automatic, e.g. hydrodynamic, design can be provided as the pull-away clutch. There is then, in any event, a particular type of operation, which is otherwise only achievable with substantially greater complexity using a hydraulic torque converter in combination with a manual shift epicyclic gearbox.

I claim:

1. In a double clutch power transmission system for a motor vehicle, comprising a change-speed gearbox and first and second clutches operable to connect the gearbox to an engine shaft, the gearbox comprising a plurality of gear stages, the first clutch being coordinated to one single gear stage associated with higher vehicle speeds and the second clutch being coordinated to additional ones of the gear stages, the improvement comprising:

said change-speed gearbox comprising at least first and second rotatable shafts, said second shaft comprising an output shaft, a plurality of said gear stages each being deselectable and each being mutually exclusively selectable for transmitting rotary motion between said shafts through each selected one of said gear stages, a gear stage selector including a gear lever which is manually movable to cause deselection of any previously selected gear stage and to cause selection of any desired gear stage, said gear lever being operable in a plurality of laterally disposed shift levels and in each such shift level in each of two directly opposite directions into first and second limit positions, a manually actuated pull-away clutch coordinated to said second clutch, said pull-away clutch biased to a normally torque transmitting state and actuated by way of a clutch pedal;

an on-off control coupled to said first and second clutches such that said second clutch is controlled simultaneously and oppositely to said first clutch, said on-off control comprising a manually operable on-off switching element mounted on said gear lever, the switching element biased to a centralized position with respect to the gear lever and having two working positions, each disposed in one of two directly opposed directions, said switching element being movable into each one of its working positions in response to manual force applied to the gear lever, said on-off control further comprising inverse switching means for causing switch-on when subsequent to the selection of a gear stage the switching element is tipped into the working position in the direction of deselection while said gear stage remains in the currently selected state, and for causing switch-off when the switching element is tipped into the working position towards the current limit position of said gear lever.

2. The double clutch power transmission system as claimed in claim 1, wherein the on-off switching element has an interlock which is ineffective when one of the additional ones of the gear stages is selected.

3. The double clutch power transmission system as claimed in claim 1, wherein the pull-away clutch is connected to a drive part or both the first and second clutches.

4. The double clutch power transmission system as claimed in claim 1, wherein the on-off control comprises a switch-on interlock comprising an interrupter which is closed when the clutch pedal is released.

5. The double clutch power transmission system as claimed in claim 1, further comprising a pivoting lever which pivots about a pivot bearing and actuates the first and second clutches; and a closing spring which applies a spring force to actuate the second clutch via the pivoting lever;

said pivot bearing movably mounted to move toward and away from the first clutch.

* * * * *

UNITED STATES PATENT AND TRADEMARK OFFICE
CERTIFICATE OF CORRECTION

PATENT NO. : 5,275,266
DATED : January 4, 1994
INVENTOR(S) : Valentin Balass

It is certified that error appears in the above-indentified patent and that said Letters Patent is hereby corrected as shown below:

Column 6, claim 3, line 3, delete "or" and substitute therefor --of--.

Signed and Sealed this

Twentieth Day of September, 1994

Attest:

BRUCE LEHMAN

Attesting Officer

*Commissioner of Patents and Trademarks*